DIGITAL TELEMETRY SYSTEM

Filed Aug. 28, 1964 3 Sheets-Sheet 1

INVENTOR
Marjorie R. Townsend &
Paul M. Feinberg

BY

ATTORNEY

INVENTOR
Marjorie R. Townsend & Paul M. Feinberg

BY

ATTORNEY

INVENTOR
Marjorie R. Townsend &
Paul M. Feinberg

BY

ATTORNEY

United States Patent Office 3,380,042

Patented Apr. 23, 1968

3,380,042

DIGITAL TELEMETRY SYSTEM

Marjorie R. Townsend, Washington, D.C., and Paul M. Feinberg, Silver Spring, Md., assignors to the United States of America as represented by the Administrator of National Aeronautics and Space Administration Filed Aug. 28, 1964, Ser. No. 392,973

14 Claims. (Cl. 340—174.1)

ABSTRACT OF THE DISCLOSURE

Apparatus to compensate for wow and flutter induced in telemetry systems that utilize a storage medium such as a tape recorder. Digital words are converted into a serial pulse train which is transmitted at a constant bit rate. A variable number of digital bits is added at the end of the serial pulse train associated with each word to result in a constant output bit rate thus compensating for tape recorder speed variations.

The invention described herein may be manufactured and used by and for the Government of the United States of America for governmental purposes without the payment of any royalites thereon or therefor.

This invention relates generally to digital telemetry systems, and more particularly to digital data conversion and transfer systems which compensate for wow and flutter induced in a telemetry system using a tape recorder as a storage medium.

In telemetry systems such as those carried by earth orbiting satellites, experimental data is sampled in a format sequence, converted to digital form and stored on a tape recorder, and upon interrogation transmitted to a ground station. For example, in certain types of meteorological satellites carrying radiation experiments, it is required that a number of radiometer channels (each representing a spectral region) be continuously sampled at a given rate (e.g., 30 times per second or more) during an earth orbit that may last more than 100 minutes, and that the sampled data be read out at a greatly increased tape speed in a relatively short period of time (4.5 minutes) once during each orbit.

Although, a tape recorder provides an efficient data storage system, irregular motion of the tape, especially at playback speeds, introduces a modulation of the amplitude and frequency of the playback signal; that is, produces wow and flutter in the playback signal. This in turn results in a variable bit rate of the digital data that is read out. Prior art techniques for compensating for this wow and flutter during readout of the stored data include frequency demodulation (FM) techniques with automatic frequency control (AFC) schemes to vary the playback speed of the tape recorder to compensate for irregular playback speeds of the tape. These FM techniques have limited accuracy and the AFC techniques have inherent instabilities. In a further technique wherein the data is recorded in parallel and subsequently converted to serial form for transmission, a discriminator is used on the output of a clock track of the tape to produce a signal for frequency control of an oscillator that clocks a parallel-to-serial converter at the output of the tape recorder during readout. However, such systems require the use of a complex AFC loop for the clock signal and variations in oscillator frequency which occur while compensating for tape recorder wow and flutter will result in a varying transmitted bit rate.

It is therefore among the objects of the present invention to provide a simplified and improved digital telemetry system of the type utilizing a tape recorder for a storage medium.

Another object is to provide an improved airborne digital telemetry system which compensates for the wow and flutter during playback of the tape recorder utilized as a storage medium.

Still another object of the invention is to provide an airborne digital telemetry system having a stabilized transmission bit rate for reliable ground synchronization.

It is another object of the invention to provide an improved airborne digital telemetry system utilizing a tape recorder for parallel storage and subsequent serial readout of digital data, wherein the transmitted bit rate is as stable as the clock controlling the bit rate to thereby simplify ground acquisition and synchronization of the data bits.

A further object of the invention is to provide simplified readout logic circuitry to produce serial readout of digital data that has been stored in parallel on a multi-channel tape recorder.

A still further object of the invention is to provide, in a digital telemetry system of the type described, a unique method for parallel storage and subsequent serial readout of digital data on a tape recorder in a manner that provides a constant bit rate and variable digital word length, thereby compensating for wow and flutter introduced by the tape recorder.

A more specific object of the invention is to provide an improved digital telemetry system wherein a plurality of digital data tracks and a clock track are recorded in parallel laterally across the tape of a tape recorder storage medium and subsequently read out via a synchronously clocked parallel-to-serial converter to produce a constant bit rate and variable digital word length that compensates for changes in speed of the tape recorder and variations of the recording rate.

Other objects as well as the features and the attending advantages of the invention will become apparent from the following description when taken in conjunction with the accompanying drawings, in which.

In practicing the present invention there is provided a digital telemetry system of the type using a multi-track digital tape recorder as a storage medium. Data from a plurality of channels is periodically sampled, converted to binary form and recorded in parallel laterally across the tape to provide a parallel multi-bit digital word. A clock signal is also recorded in parallel on the digital tape recorder, 90 degrees out-of-phase with the data recorded from the sampled channels.

On playback of the digital tape recorder a signal derived from the recorded out-of-phase clock signal causes parallel load-in of a shift register of the information bits recorded across the tape. After load-in of a selected parallel binary word the shift register is then shifted with a stable clock signal so that the bits are fed out serially and supplied to a transmitter. The rate at which the bits are shifted out are such that the shift register is emptied before the next parallel word is loaded in, with "zeros" being produced serially at a stable bit rate until the next load-in signal appears on the tape. Load-in of the shift register is controlled by a synchronizing circuit that prevents loading during serial readout of a digital word. As a result the transmitted bit rate is as stable as the clock that shifts the register for serial readout and independent of irregular tape motion. This provides a constant transmitted bit rate, with changes in speed of the tape recorder and recording rate being compensated for by varying the number of "zeros" produced at the end of the word and hence the digital word length. This in turn simplifies ground acquisition and synchronization of the serially transmitted data bits.

*General description*

Figures 1, 2:
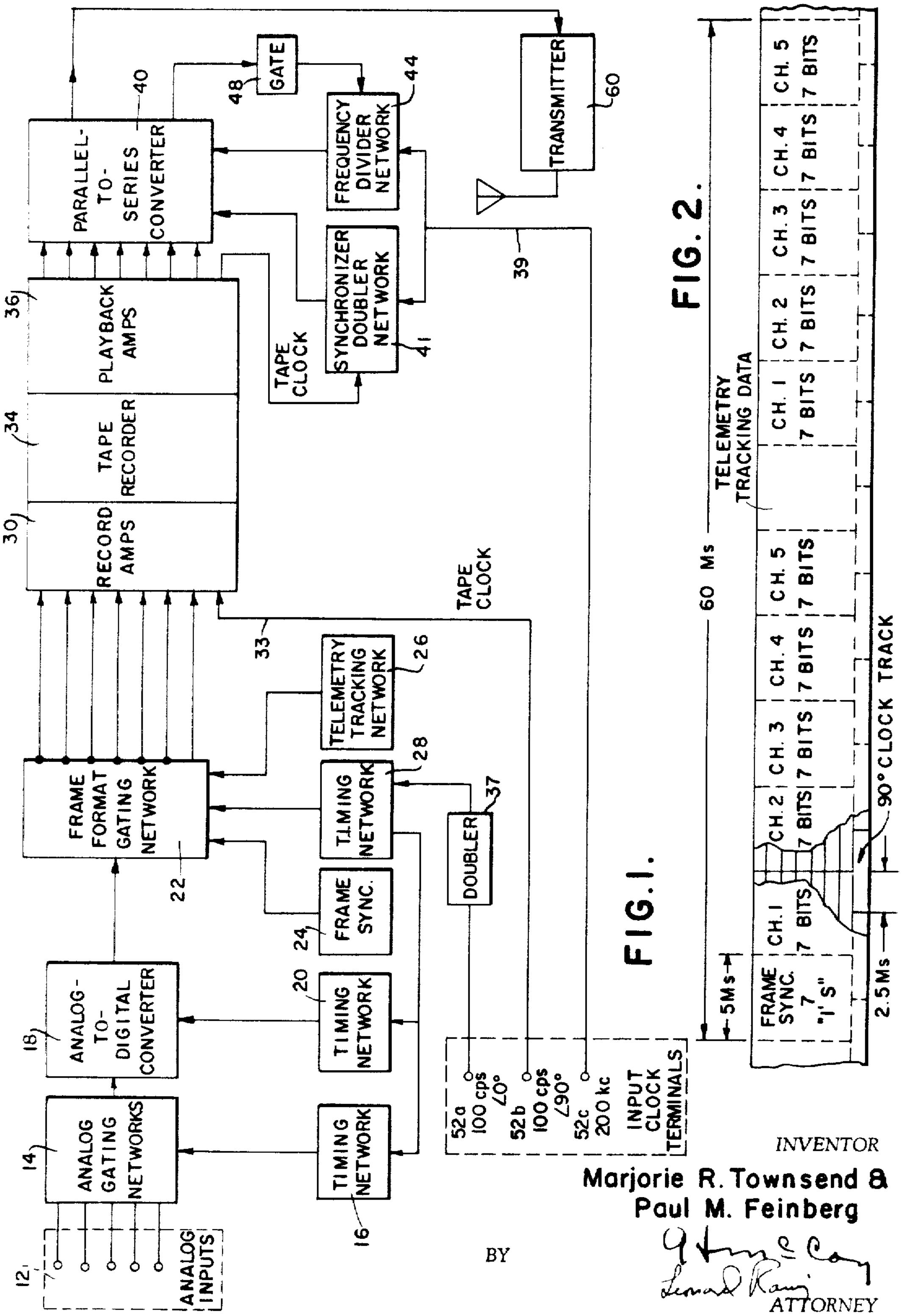
FIGURE 1 is a schematic diagram, in block form, of a telemetry system embodying the present invention.
FIGURE 2 is a schematic representation of the tape format utilized in the system of FIGURE 1.

An illustrative embodiment of an airborne system incorporating the present invention is shown in block form in FIGURE 1. Such a system, for example, has been utilized in meteorological satellites of the TIROS and NIMBUS series and circuit details and timing charts therefor are set forth in NASA Technical Notes TN D–2311 and TN D–2315, June 1964 and July 1964, respectively, National Aeronautics and Space Administration, Washington, D.C. The subject matter of these technical notes are herein incorporated in the present specification.

Considering such a system briefly, sampled information from a number of channels (five representatively shown) is supplied to analog input terminals 12 of analog gating network 14. Analog gating network 14 may be comprised of a number of AND gates, each receiving a control signal from timing network 16 to enable the analog signal applied to respective ones of terminals 12 to be sequentially sampled.

The outputs of analog gating network 14 are coupled to the input of analog-to-digital converter 18 to thereby digitize the analog information of each sampled channel. Thus, the output of analog-to-digital converter 18 consists of a 7-bit parallel binary word for each sampled channel. Encoding, clock and transfer pulses for analog-to-digital converter 18 are supplied from timing network 20. Any suitable analog-to-digital converter or encoder may be used, and in circuit detail forms no part of the invention.

The 7-bit parallel binary words produced by analog-to-digital converter 18 are fed to frame format gating network 22. Frame synchronizing circuit 24 supplies a synchronizing signal (7 binary bits in parallel) to frame format gating network 22, and telemetry network 26 supplies telemetry tracking data to frame format gating network 22. Timing pulses are supplied to frame format gating network 22 by timing network 28 to produce a complete frame comprised of two samples of each channel, synchronizing signals, and tracking data.

The output of frame format gating network 22 is fed to a plurality of tape recorder amplifiers 30, one amplifier for each bit of the 7-bit parallel word provided by analog-to-digital converter 18. A further amplifier is provided for a tape clock signal, to be subsequently described, supplied on lead 33. Each tape recorder amplifier, in turn, is coupled to an appropriate record-playback head associated with multitrack digital tape recorder 34. Thus, an eight track recorder may be used: one track to record each bit of a 7-bit parallel word, and one track to record the clock signal to be recorded on the tape. The clock signal is recorded 90° out-of-phase with respect to the other tracks on the tape. As a result, processed data in the form of a 7-bit binary word and a clock signal is recorded in parallel laterally across the tape of tape recorder 34.

Tape recorder 34 may be a two-speed recorder which carries a quarter-inch tape in a continuous loop cartridge across an eight track staggered digital record-playback head. In the record mode recorder 34 operates at a slow speed such as 0.45 inch per second during an orbit of approximately 100 minutes. Upon receiving an interrogation signal as the satellite passes over a data acquisition station the recorder is switched to a playback mode and is operated at a high speed (such as 11.7 inches per second) for approximately 4.5 minutes. This is a 26 to 1 speed-up and accordingly data originally recorded at a nominal rate of 200 bits per second is played back at a rate of 5200 bits per second.

When operating in the playback mode, the stored data on each track of tape recorder 34 is supplied by the record-playback head to playback amplifiers 36. As in the instance of record amplifiers 30, one playback amplifier 36 is provided for each track on the tape, and a plurality of such amplifiers feeds the 7-bit parallel word indicative of the recorded digital information provided by analog-to-digital converter 18 to parallel-to-serial converter 40. A further playback amplifier is provided for the out-of-phase clock track recorded on the tape of recorder 34.

This recorded clock signal is fed to one input of the synchronizer-doubler network 41, with the output of network 41 supplying synchronized load-in pulses to parallel-to-serial converter 40. Shift pulses for parallel-to serial converter 40 are supplied by frequency divider network 44. Gate 48 is coupled between parallel-to-serial converter 40 and divider network 44 to inhibit shift pulses after a digital word has been serially read out. As will be subsequently discussed, both synchronizer-doubler network 42 and divider network 44 receive stable clock pulses (200 kc.) via lead 39. The output of parallel-to-serial converter 40, consisting of serialized digital data, is coupled to transmitter 60 where it is transmitted as a serial train of pulses to a remote data acquisition station.

Overall timing of the above described system is provided by primary clock signals supplied to clock input terminals **52*a*, 52*b* and 52*c*. Terminal 52*a* receives a square wave clock signal at a reference phase (100 c.p.s. at 0°), which signal is doubled by network 37 and fed to timing network 28. The output of timing network 28, in turn, is fed to timing networks 16 and 20 and to frame format gating network 22. This doubled clock signal (200 c.p.s. at 0°) corresponds to a data sampling rate of 200 bits per second in a non-return-to-zero (NRZ) format, and is used to clock a divide-by-six ring counter in timing network 16. The output of this counter, in turn, sequentially passes analog data from each channel for input terminals 12 to analog-to-digital converter 18. The 200 c.p.s. 0° clock signal is also fed to timing network 20 to provide suitable transfer, encoding and clocking pulses for analog-to-digital converter 18. As a result, the analog input from a plurality of channels of sampled data is converted to a 7-bit parallel binary word that is held by analog-to-digital converter 18** until a transfer pulse is received, at which time it is read out for a prescribed period (five milliseconds for a 200 bit per second data rate).

The 200 c.p.s. 0° clock signal also gates frame format gating network 22 to apply the 7-bit parallel outputs of analog-to-digital converter 18 to the input of record amplifiers 30 and thence to tape recorder 34 in a desired sequence. For a given count, control gates in frame format gating network 22 pass digital data from either analog-to-digital converter 18 or frame synchronizing and telemetry tracking networks 24 and 26, inhibiting the other two from being fed to tape recorder 34.

In addition to the parallel digital bits from analog-to-digital converter 18 and networks 24 and 26, a clock signal is recorded on a further track of tape recorder 34. To this end a 100 c.p.s. 90° square wave, equal to alternate binary "1's" and "0's" at a 200 bit per second data rate, is applied to terminal **52*b* and thence tape recorder 34 via lead 33 and a selected one of record amplifiers 30. Thus this clock signal is recorded 90° out-of-phase with the 7 parallel bits recorded on the other tracks of tape recorder 34, to be subsequently read out and supplied to synchronizer-doubler network 41 during operation of recorder 34** in the playback mode.

Also, as will be subsequently described, terminal **52*c* receives a stable clock signal (200 kc.) that is supplied, via lead 39, to synchronizer-doubler network 41 and divider network 44. This clock signal provides timing for synchronizing parallel load-in and series read-out parallel-to-serial converter 40**, with the transmitted bit rate determined by the stability of this clock signal.

*Recorded tape format*

FIGURE 2 is a schematic representation of a complete tape frame provided during operation in the record mode of the system described in FIGURE 1. It is to be understood that the illustrated format is representative only, and that other formats having binary data recorded in parallel across a tape and with a recorded clock signal 90° out-of-phase therewith may be utilized. Accordingly, various parameters ascribed to the binary data recorded on the tape are not to be taken as limiting.

In FIGURE 2, assuming a recorded data rate of 200 bits per second in a non-return-to-zero (NRZ) format, each bit lasts 5 milliseconds. Thus, 12 binary words may be serially recorded on the tape to provide a 60 millisecond frame. It is to be understood that each binary word is comprised of 7 parallel bits recorded laterally across the tape, there also being provided a further parallel track having the out-of-phase clock signal recorded thereon. The format for one frame, reading from left to right in FIGURE 2, includes: a frame synchronizing word composed of 7 binary bits recorded laterally across the tape; five 7-bit parallel words representing the sampled output of five information channels as provided by analog-to-digital converter 18; telemetry timing data, a 7-bit parallel word provided by telemetry tracking network 26; and five additional 7-bit words. In addition, a clock track (derived from clock input terminal **52*b***) is recorded as a 100 c.p.s. square wave, equivalent to alternating "1's" and "0's" at a 200 bit per second data rate, on a further track of the tape. The change of state of these clock pulses is delayed 2.5 milliseconds (half a pulse width) in relation to the other seven tracks. Although shown on the bottom track, it is to be understood that clock track may be provided as any one of the middle tracks on the eight track tape.

*Playback circuitry*

Figure 3:
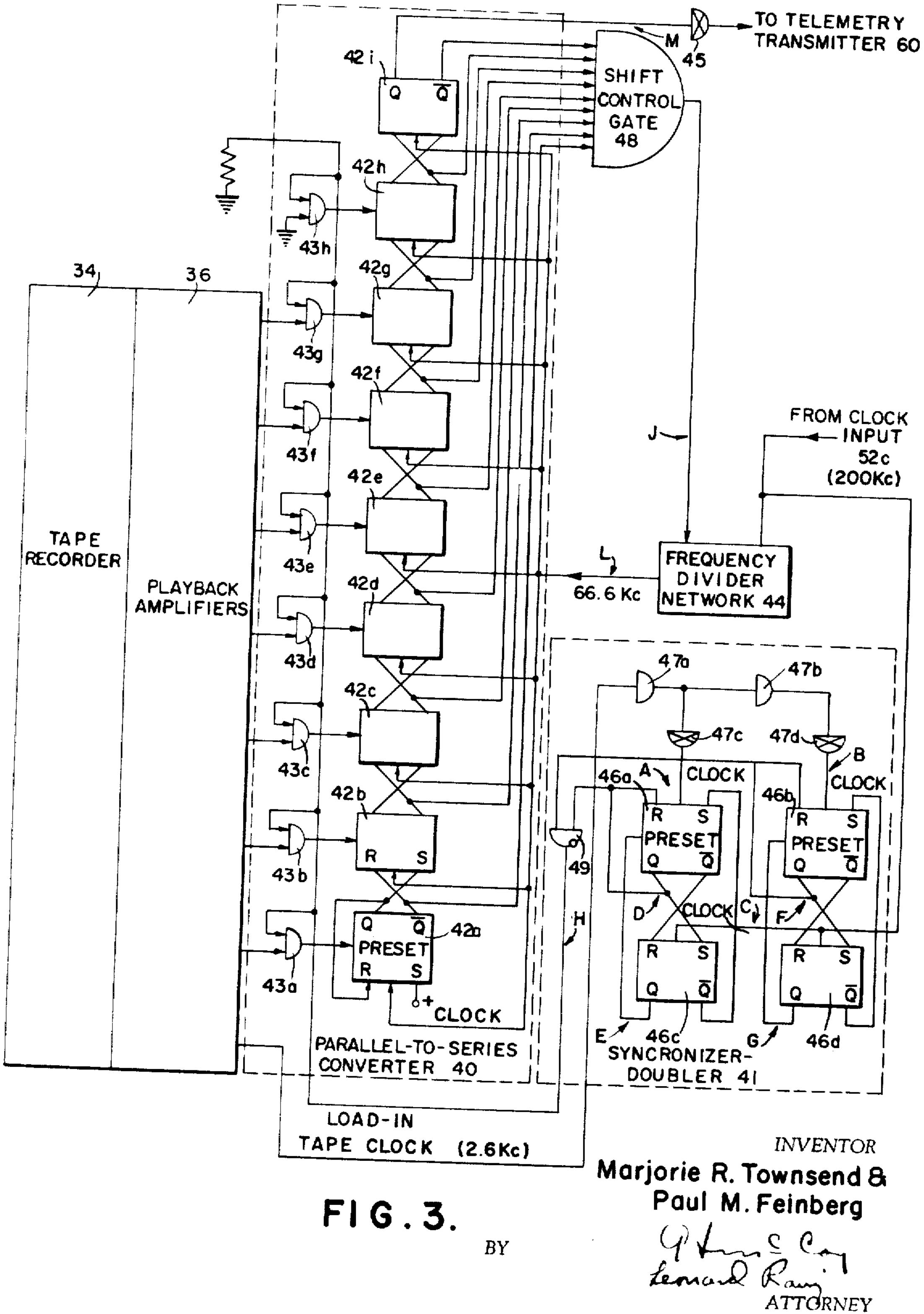
FIGURE 3 is a more detailed schematic diagram, in block form, of an embodiment of the playback circuitry of the system of FIGURE 1.

With the foregoing overall general description of an airborne telemetry system incorporating the present invention in mind, a detailed description of the playback circuitry will now be considered in conjunction with FIGURE 3. It should be kept in mind that at this point that in a practical situation data is recorded over a long period of time (one hundred minutes or more for an orbiting satellite) and read out at a relatively short period of time (4.5 minutes or less). Accordingly, tape recorder 34 is provided with a substantial speed-up ratio between operation in the record and the playback mode. Typically with a record data rate of 200 bits per second, a 26 to 1 speed-up ratio will provide a data readout of 5200 bits per second, and the clock track square wave (originally recorded at 100 c.p.s.) will provide a 2.6 kc. square wave.

The logic elements of the circuit of FIGURE 3 may be RCTL (resistor-capacitor-transistor-logic), utilizing gates of the NOR/NAND type and flip-flops of the RESET-SET configuration. For the purpose of a detailed description of a preferred embodiment of the playback circuitry of FIGURE 3, and unless otherwise specified, the gates may be type SN-512 NOR/NAND Logic networks and the flip-flop may be type SN-510 R-S flip-flop/counter networks, both supplied by Texas Instruments Incorporated, Dallas, Tex. Accordingly, each flip-flop has two logic inputs (reset and set or R and S), two logic outputs (Q and $\overline{Q}$ or "true" and "false"), a clock input for a single phase clock signal, and a present input. The logic gates provide NOR logic for positive going inputs and NAND for negative going inputs. It is to be understood that other types of logic and other specific gating and flip-flop circuitry may be utilized so long as equivalent logic functions are performed.

With particular reference to FIGURE 3, parallel-to-serial converter 40 includes flip-flops **42*a* to 42*i*, connected as a shift register. Circuits of this type are known in the art and need not be considered in detail. Briefly, "true" and "false" outputs (Q and $\overline{Q}$) of the flip-flops are respectively connected to the set and reset (S and R) of successive networks. One output (Q) of the first flip-flop 42*a*** of the shift register chain is fed back to its reset input, with its set input being returned to a fixed (positive) bias so that it and subsequent stages are conditioned to a desired state (such as binary "0") after a stored bit has been transferred out.

Flip-flops **42*a*–42*g* each receive a preset pulse, providing parallel load-in of the shift register of the 7-bit word stored by tape recorder 34, from gates 43*a*–43*g*. One input of each of gates 43*a*–43*g* is coupled to playback amplifiers 36 and the other input of each of gates 43*a*–43*g* receives a load-in pulse from synchronizer-doubler network 41**. These load-in pulses are produced by the edges of the out-of-phase clock signal recorded on the tape recorder, and are synchronized with the clock pulses that shift the register to provide parallel load-in of each digital word before it is serially read out.

Flip-flops **42*h* and 42*i* provide the final stages of the shift register chain, with flip-flop 42*h* adding a bit for word synchronization and with flip-flop 42*i* providing an output that is independent of load-in pulses. The preset pulse for flip-flop 42*h* is supplied by gate 43*h*, which gate has one input returned to ground and receives a second input from synchronizer-doubler network 41. This arrangement assures that the flip-flop 42*h* is always switched to the same state (such as binary "0") when a load-in pulse is supplied from network 41. This pulse, the first to be shifted out, provides a word synchronization bit preceding each data word serially read out. Since load-in pulses are not coherent with the read out clock pulses, output flip-flop 42*i* is driven by the output of flip-flop 42*h*** without being preset by a load-in pulse. This prevents a binary "0" word synchronization bit narrower than the transmitted bit rate from being initially shifted out after load-in to insure an unvarying transmission bit rate.

One output (such as the Q output) of flip-flop **42*i* is coupled via driver gate 45 to telemetry transmitter 60. Gate 45 is similar to the mentioned gates and further has a clamped output. Pulse inversion is provided by gate 45 so that in the time interval between serial data words to the input of the transmitter is maintained in the binary "1" state. The other output (such as the $\overline{Q}$ output) of flip-flop 42*i* is supplied to one input of multiple input shift control gate 48. This, in conjunction with similarly connected outputs from gates 42*a*–42*h*, provides an indication that parallel word has been stored and is ready to be serially read out, as will be subsequently discussed. Gate 48 may be comprised of two or more gates of the above described type connected in parallel to provide for fan-in limitations. When all such inputs are in the same state (such as binary "0") the output of gate 48 inhibits the output divider network 44 that generates shift pulses for flip-flop 42*a*–42*i*. Accordingly, serial shifting ceases until a subsequent parallel word is loaded into the shift register from tape recorder 34**.

Figure 4:
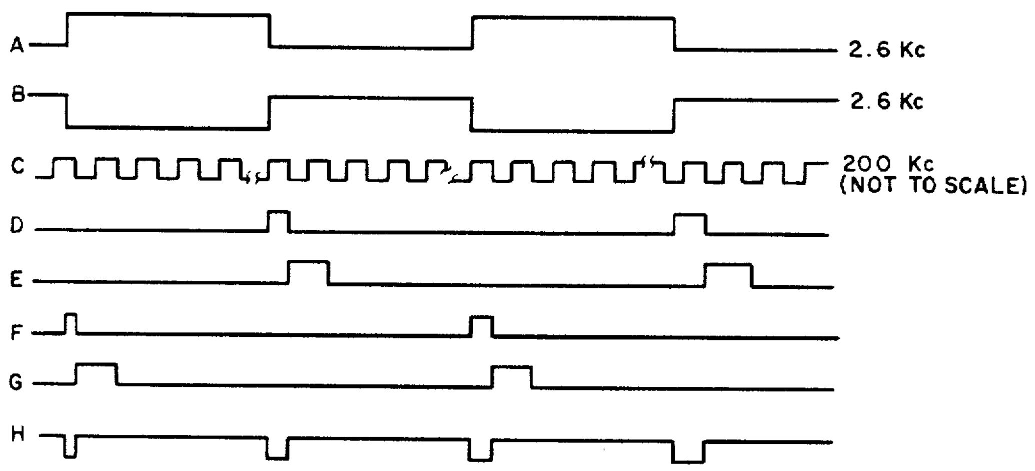
FIGURES 4 and 5 are a series of waveforms helpful in understanding the operation and concepts of the invention.

Load-in pulses applied to gate **43*a*–43*i* are derived from synchronizer-frequency doubler 41, comprised of flip-flops 46*a*-46*d*, each flip-flop being of the described type. To this end flip-flops 46*a* and 46*b* are clocked out-of-phase with respect to one another by the 2.6 kc. clock signal derived from tape recorder 34 and applied to their clock terminal via gates 47*a*–47*d*, with gate 47*b* providing phase inversion for flip-flop 46*b*. Gates 47*c* and 47*d*** have a clamped output and function as drivers for flip-flops 46a and 46b. The resulting clock signals for flip-flops 46a and 46b are shown by waveforms A and B of FIGURE 4. The outputs (Q and $\overline{Q}$) of the flip-flops 46a and 46b are respectively connected to the set and reset (S and R) inputs of flip-flops 46c and 46d, and the outputs (Q and $\overline{Q}$) of flip-flops 46c and 46d are respectively connected back to the set and preset inputs of flip-flops 46a and 46b. In addition, flip-flops 46c and 46d are clocked in-phase with a 200 kc. clock signal derived from clock terminal 52c and applied to their inputs, as shown by waveform C of FIGURE 4. Because of the non-coherency of the 2.6 kc. and 200 kc. clocking rates, flip-flops 46a and 46b are alternately triggered by the edges of the 2.6 kc. clock track signal and subsequently and immediately reset by flip-flops 45c and 46d to provide relatively short pulses, varying from approximately 0.5 to 6.0 microseconds in width. As a result the pulses shown by waveforms D–G of FIGURE 4 appears respectively at the outputs of flip-flops 46a–46d. It is to be noted that the output of flip-flop 46a (waveform D) coincides with one edge of the 2.6 kc. clock track signal and the output of flip-flop 46b (waveform F), clocked out-of-phase with respect to flip-flop 42a, coincides with the opposite edge of the 2.6 kc. clock track signal. One output (the Q output) of each of flip-flops 46a and 46b is applied to a correspondnig input of gate 49, where such outputs are combined (waveform H of FIGURE 4) to provide relatively short pulses at a 5.2 kc. rate that are synchronized with the leading and trailing edges of the 2.6 kc. clock track signal. The output of gate 49 is applied to flip-flops 42a–42h to provide parallel load-in flip-flops 42a–42g and to add a word synchronizing bit to flip-flop 42h.

The clock signal applied to terminal 52c (200 kc.) is also applied to frequency divider network 44 and the output of frequency divider 44 is in turn applied to the clock input of flip-flops 42a–42h. Network 44 is a divide-by-three frequency divider and provides a 66.6 kc. clock pulse that causes the 7-bit word and the added synchronization bit that have been loaded into the shift register chain to be serially read out. Shifting continues until shift control gate 48 indicates that all the bits have been transferred out and at this time shift control gate 45 supplies an inhibiting signal to frequency divider network 44. Shifting then ceases until the next parallel word is loaded into the shift register.

Figure 5:
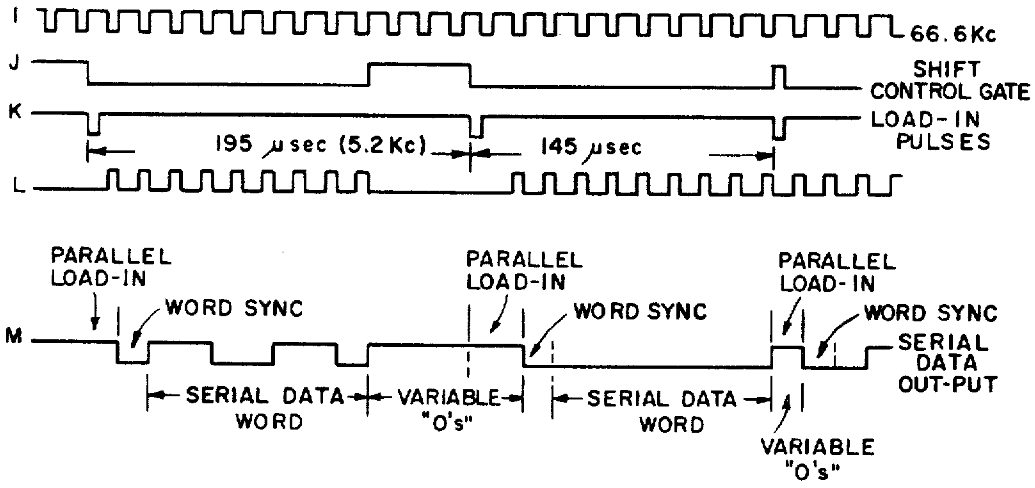

The operation of the described system during playback may be best understood in conjunction with the waveforms of FIGURE 5. The shift register clock pulse (66.6 kc.) generated by frequency divider network 44 to provide serial readout of stored data is shown by waveform I, and the output of shift control gate 48, which inhibits the output of frequency divider network 44, is shown by waveform J. The load-in pulses for flip-flops 42a–42h is shown by waveform K and is the same as waveform H of FIGURE 4. As mentioned, application of the pulses of waveform K to gates 43a–43h causes parallel load-in of a 7-bit word to flip-flops 42a–42g and and of a word synchronization bit to flip-flops 42h. This, in turn, causes gate 48 to remove the inhibiting signal from frequency divider network 44. A slight delay is provided (10–25 microseconds) to prevent concurrent load-in and shifting. The output of frequency divider network 44 is shown by waveform L, and it can be seen that shift pulses continue until all stored bits are shifted out, at which time gate 48 inhibits the output frequency divider network 44. This occurs when all inputs to gate 48 are in the same state such as binary "0." The output of flip-flops 42h then remains in the "0" state until the next load-in pulse (waveform K). This state may be considered a series of variable "0's" as shown by waveform M, representing the output of flip-flop 42h that supplies a serial train of pulses to transmitter 60 via gate 45. Waveform M includes consecutively and respectively, a parallel load-in interval, a synchronization bit, a serial word and a series of variable "0's."

Wow and flutter in tape recorder 34 will cause the load-in pulses of waveform K to vary in time. Thus for the 5200 bit rate representatively shown, the load-in pulses of waveform K are approximately 192 microseconds apart if wow and flutter is not present and if a perfect square wave is recorded on the clock track of tape recorder 34. Tape recorder speed variations will cause load-in pulses to vary ±5 microseconds, and an additional 10 microsecond variation may be estimated due to recorded square wave non-symmetry. A maximum time of 145 microseconds, representing 9 shift pulses and a control delay time, is necessary to completely shift out a complete word and a word synchronization bit. Accordingly, a 32 microsecond interval remains, during which interval a series of binary "0's" is transmitted. As a result, data may be transmitted at a constant bit rate, with a variable word length represented by "0's" compensating for tape recorder wow and flutter that are introduced by tape recorder speed variations.

Although a specific airborne telemetry system has been described with particularity for the purpose of explaining the invention, it is not limited to the specific system and particular circuit arrangement herein disclosed, and modifications and variations thereof should be obvious to those skilled in the art. It is therefore to be understood that within the scope of the appended claims the invention may be practiced otherwise than specifically set forth.

What is claimed as new and desired to secured by Letters Patent of the United States is:

1. In a digital telemetry system, a multi-track storage medium having a plurality of input and output channels, means coupled to said input channels to record information bits representative of successive digital words and a clock signal in parallel on said storage medium, a parallel-to-serial converter coupled with the output channels of said storage medium, synchronizing circuit means for supplying load-in pulses to said parallel-to-serial converter in response to said recorded clock signal to provide load-in of said parallel-to-serial converter with said parallel digital words upon readout of said storage medium, and control means applying clock pulses to said parallel-to-serial converter to provide serial readout of each digital word prior to parallel load-in of a successive digital word, said clock pulses occurring at a rate that causes all information bits of each digital word to be serially transferred out of said parallel-to-serial converter prior to parallel load-in thereof with a successive digital word, with speed variations of said storage medium producing a variable word length for each digital word serially transferred out of said parallel-to-serial converter, the bit rate for each digital word being determined by said clock pulses independently of speed variations of said storage medium.

2. In a digital telemetry system, a multi-track tape recorder having a plurality of input and output channels, means coupled to said input channels for recording successive digital words and a clock signal in parallel transversely across the tape of said tape recorder, a parallel-to-serial converter coupled with selected output channels of said tape recorder, synchronizing circuit means coupled between a further output channel of said tape recorder and said parallel-to-serial converter, said synchronizing circuit means responsive to said recorded clock signal to supply load-in pulses to said parallel-to-serial converter to provide load-in of said parallel-to-serial converter with said parallel digital words upon playback of said tape recorder, a source of clock pulses, and control means for applying said clock pulses to said parallel-to-serial converter to cause the bits of each digital word to be serially transferred out of said parallel-to-serial converter, said clock pulses occurring at a data rate that transfers all bits of each digital word out of said parallel-to-serial converter prior to load-in thereof with a successive digital word, there being provided a series of further bits of a given binary state after each digital word has been transferred out of said parallel-to-serial converter and until parallel load-in thereof with a successive digital word, said transferred bit rate being determined by said clock pulses independently of speed variations of said tape recorder.

3. In a digital telemetry system, a multi-track tape recorder having a plurality of input and output channels, means coupled with selected input channels of said tape recorder for recording binary information bits representative of successive digital words on the tape of said recorder, each digital word being comprised of a plurality of bits recorded in parallel on parallel tracks of the tape of said tape recorder, means coupled with a further input channel of said tape recorder for recording a square wave on an additional track of the tape of said tape recorder, said square wave being out-of-phase with respect to said information bits, a parallel-to-serial converter coupled with selected output channels of said tape recorder, synchronizing circuit means coupled between a further output channel of said tape recorder and said parallel-to-serial converter, said synchronizing circuit means producing load-in pulses to cause parallel load-in of said parallel-to-serial converter with the information bits of a digital word in response to said recorded square wave, a source of clock pulses, and control means for applying said clock pulses to said parallel-to-serial converter to cause the bits of each digital word to be serially transferred out of said parallel-to-serial converter prior to load-in of a successive digital word, with the spacing between said load-in pulses varying in accordance with tape recorder speed variations to produce a variable word length for each digital word serially transferred out of said parallel-to-serial converter, and with the data bit rate for each digital word determined by said clock pulses independently of tape recorder speed variations.

4. The system as defined in claim 3 and wherein said square wave is recorded 90° out-of-phase with said information bits and said load-in pulses are produced in coincidence with the leading and trailing edges of said square wave to cause load-in of said parallel-to-serial converter at the approximate center of said information bits.

5. The system as defined in claim 4 and wherein said parallel-to-serial converter includes a shift register comprised of a plurality of flip-flop networks connected in cascade, said clock pulses being applied to each flip-flop network by said control means, a plurality of gating networks each having one input coupled to selected output channels of said tape recorder and an output coupled to a corresponding flip-flop network, and with a second input of each of said gating networks coupled to said synchronizing circuit means to receive load-in pulses therefrom.

6. The system as defined in claim 5 and wherein said parallel-to-serial converter includes a further flip-flop network connected in cascade with the final one of said plurality of flip-flop networks, a further gating network having an output coupled to said further gating network coupled to a reference potential and a second input of said further gating network coupled to said synchronizing circuit means to receive load-in pulses therefrom, such that said load-in pulses switch said further flip-flop network to a given binary state to provide a word synchronization bit for each digital word serially transferred out of said shift register by said clock pulses.

7. The system as defined in claim 6 wherein said control means includes a multiple input coincidence gating network receiving an input from an output of each of said flip-flop networks and having an output coupled to said source of clock pulses, said multiple coincidence gating network inhibiting application of said clock pulses to said flip-flop networks when all said flip-flop networks are in the same binary state and until parallel load-in of said shift register with a successive digital word, said same binary state being variable in length in proportion to tape recorder speed variations.

8. A playback system for digital telemetry apparatus having a storage medium wherein information bits representative of successive digital words and an out-of-phase clock signal are recorded in parallel, with said information bits being recorded at a first speed and subsequently read out at a second speed substantially greater than said first speed, said playback system including in combination, a parallel-to-serial converter coupled to said storage medium, synchronizing circuit means for supplying load-in pulses to said parallel-to-serial converter in response to said out-of-phase clock signal to provide load-in of said parallel-to-serial converter with said digital words upon readout of said storage medium, a source of clock pulses for serial readout of said parallel-to-serial converter, and control means supplying said clock pulses to said parallel-to-serial converter to provide serial readout of the bits of each digital word prior to parallel load-in of a successive digital word, with speed variations of said storage medium producing variations in the spacing of said load-in pulses to thereby provide a variable digital word length, and with the bit rate of each digital word being determined by said clock pulses independently of speed variations of said storage medium.

9. A playback system for digital telemetry apparatus having a multi-channel tape recorder storage medium wherein information bits representative of successive digital words and an out-of-phase clock signal are recorded in parallel transversely across the tape of said recorder, with said information bits being recorded at a first speed and subsequently played back at a second speed substantially greater than said first speed, said playback system including in combination, a parallel-to-serial converter coupled with selected output channels of said tape recorder, synchronizing circuit means coupled between a further output channel of said tape recorder and said parallel-to-serial converter, said synchronizing circuit means operable to produce pulses in response to said out-of-phase clock signal to provide parallel load-in of said digital words into said parallel-to-serial converter, a source of clock pulses, and control means for applying said clock pulses to said parallel-to-serial converter to cause the bits of each digital word to be serially transferred out of said parallel-to-serial converter subsequent to parallel load-in thereof, said clock pulses occurring at a data rate that transfers all bits of each digital word out of said parallel-to-serial converter prior to load-in thereof with a successive digital word, said bit rate being determined by said clock pulses independently of speed variations of said tape recorder.

10. A playback system for digital telemetry apparatus having a tape recorder with a plurality of input and output channels wherein information bits representative of successive digital words and a square wave are recorded in parallel transversely across the tape of said recorder, with said information bits being recorded at a first speed and subsequently played back at a second speed substantially greater than said first speed, said playback system including in combination, a parallel-to-serial converter coupled with selected output channels of said tape recorder, synchronizing circuit means coupled between a further output channel of said tape recorder and said parallel-to-serial converter, said synchronizing circuit means operable to produce load-in pulses to provide parallel load-in of said parallel-to-serial converter with the information bits of each digital word in response to said recorded square wave, a source of clock pulses, and control means for applying said clock pulses to said parallel-to-serial converter to cause the information bits of said single digital word to be serially transferred out of parallel-to-serial converter, said clock pulses occurring at a rate such that all information bits of each digital word is transferred out of said parallel-to-serial converter prior to load-in of a successive digital word, with the spacing between said load-in pulses varying in accordance with tape recorder speed variations to produce a variable word length for each digital word serially transferred out of said parallel-to-serial converter, and with the data bit rate for each digital word determined by said clock pulses independently of tape recorder speed variations.

11. The system as defined in claim 10 and wherein said square wave is recorded 90° out-of-phase with said information bits and said load-in pulses are produced by and relative to the leading and trailing edges of said square wave to cause load-in of said parallel-to-serial converter at the approximate center of said information bits.

12. The system as defined in claim 11 and wherein said parallel-to-serial converter includes a shift register comprised of a plurality of flip-flop networks connected in cascade, said clock pulses being applied to each flip-flop network by said control means, a plurality of gating networks each having one input coupled to selected output channels of said tape recorder and an output coupled to a corresponding flip-flop network, and with a second input of each gating network coupled to said synchronizing circuit means to receive load-in pulses therefrom.

13. The system as defined in claim 12 and wherein said parallel-to-serial converter includes a further flip-flop network connected in cascade with the final one of said plurality of flip-flop networks, a further gating network having an output coupled to said further flip-flop network, with a first input of said further gating network coupled to a reference potential and with a second input of said further gating network coupled to said synchronizing circuit means to receive load-in in pulses therefrom, such that said load-in pulses switch said further flip-flop network to a given binary state to provide a word synchonization bit for each digital word serially transferred out of shift register by said clock pulses.

14. The systems as defined in claim 13 and wherein said control means includes a multiple input coincidence gating network receiving an input from an output of each of said flip-flop networks and having an output coupled to said source of said clock pulses, said multiple input coincidence gating network operable to inhibit application of said clock pulses to said flip-flop networks when all said flip-flop networks are in the same binary state and until parallel load-in of said shift register with a successive digital word, said same binary state being variable in length in proportion to tape recorder speed variations.

References Cited

UNITED STATES PATENTS 3,267,460 8/1966 Merrell et al. ------- 340—347

BERNARD KONICK, *Primary Examiner.*

B. HALEY, *Assistant Examiner.*